United States Patent [19]

Kashimura

[11] Patent Number: 5,381,179
[45] Date of Patent: Jan. 10, 1995

[54] CAMERA-INTERGRATED VIDEO RECORDER APPARATUS

[75] Inventor: Kazunori Kashimura, Tokyo, Japan

[73] Assignee: Canon Kabushiki Kaisha, Tokyo, Japan

[21] Appl. No.: 164,993

[22] Filed: Dec. 10, 1993

Related U.S. Application Data

[63] Continuation of Ser. No. 908,486, Jun. 30, 1992, abandoned, which is a continuation of Ser. No. 798,350, Nov. 21, 1991, abandoned, which is a continuation of Ser. No. 683,122, Apr. 9, 1991, abandoned, which is a continuation of Ser. No. 499,901, Mar. 27, 1990, abandoned.

[30] Foreign Application Priority Data

Mar. 30, 1989 [JP] Japan ................................. 1-80883

[51] Int. Cl.⁶ ...................... H04N 5/225; H04N 5/232
[52] U.S. Cl. .................................. 348/376; 348/211; 348/372; 348/333
[58] Field of Search ............... 358/909, 209, 906, 224, 358/210, 229, 41; 354/219, 223, 288; 348/376, 373–375, 372, 211, 207, 222, 333, 233, 341, 369; H04N 9/04

[56] References Cited

U.S. PATENT DOCUMENTS

| | | | |
|---|---|---|---|
| 4,420,773 | 12/1983 | Toyoda et al. | 358/335 |
| 4,550,343 | 10/1985 | Nakatani | 358/229 |
| 4,625,243 | 11/1986 | Takubo | 358/229 |
| 4,682,240 | 7/1987 | Bachmann | 358/224 |
| 4,959,729 | 9/1990 | Fukuda et al. | 358/229 |
| 4,963,987 | 10/1990 | Ichiyoshi et al. | 358/229 |
| 4,965,462 | 10/1990 | Crawford | 307/66 |
| 5,119,203 | 6/1992 | Hosaka et al. | 358/229 |

FOREIGN PATENT DOCUMENTS

| | | | |
|---|---|---|---|
| 0203783 | 12/1986 | European Pat. Off. | G11B 31/00 |
| 0195370 | 11/1983 | Japan | H04N 5/26 |
| 0158175 | 9/1984 | Japan | H04N 5/26 |
| 0074044 | 4/1988 | Japan | G03B 19/02 |
| 0077040 | 4/1988 | Japan | G03B 17/16 |
| 0121830 | 5/1989 | Japan | G03B 17/56 |

Primary Examiner—James J. Groody
Assistant Examiner—Safet Metjahic
Attorney, Agent, or Firm—Robin, Blecker, Daley & Driscoll

[57] ABSTRACT

A camera-integrated video recorder in which a camera portion and a recorder portion are disposed in a single casing is arranged in such a manner that a grip portion having a viewfinder and a control portion for controlling the recorder portion is rotatably and detachably fastened to the casing. The grip portion acts as a remote control device for remote-controlling the camera portion and the recorder portion when it has been detached from the casing. The casing has an image transmission circuit for transmitting monitor image information to the viewfinder in the grip portion.

17 Claims, 3 Drawing Sheets

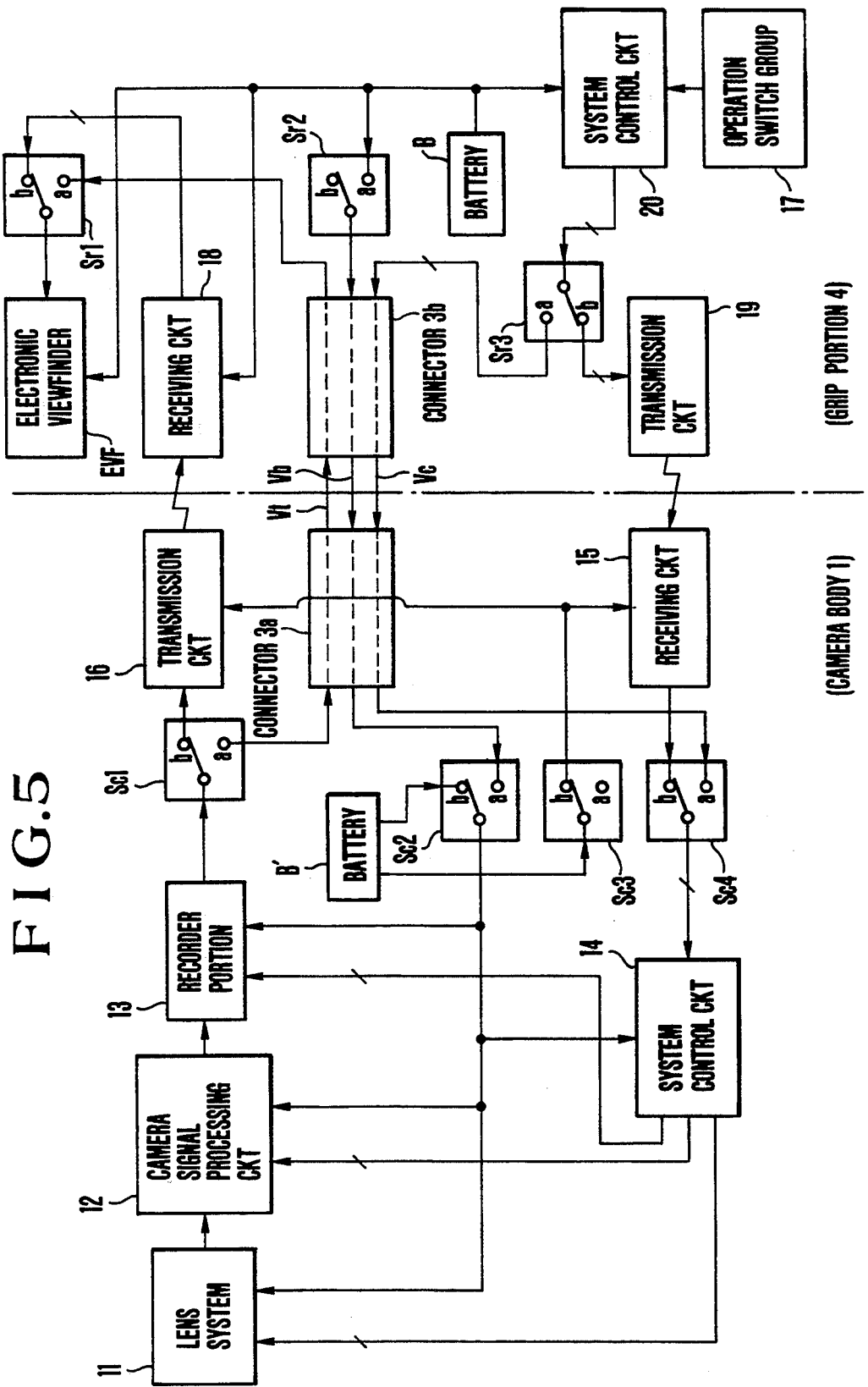

CAMERA-INTERGRATED VIDEO RECORDER APPARATUS

This is a continuation application under 37 CFR 1.62 of prior application Ser. No. 908,486, filed Jun. 30, 1992, which is a cont. of Ser. No. 798,350 filed Nov. 21, 1991 (now aband.), which is a cont. of Ser. No. 683,122 filed Apr. 9, 1991 (now aband.), which is a cont. of Ser. No. 499,901 filed Mar. 27, 1990 (now aband.)

BACKGROUND OF THE INVENTION

1. Field of the Invention:

This invention relates to a video camera and a camera-integrated video recorder apparatus.

2. Description of the Related Art

In recent years, so-called camera-integrated video recorders, each of which is arranged in such a manner that an image sensing portion (a camera portion) and a recorder portion are positioned in a single casing, have been widely used because they can be easily handled and they have excellent mobility due to their compact size and light weight. In order to further facilitate handling, a structure has been disclosed in which a viewfinder portion is arranged to be movable. Furthermore, another structure has been disclosed in, for example, U.S. Pat. No. 4,494,147, U.S. Pat. No. 4,963,987 filed on Nov. 3, 1988. According to the disclosure, an individual casing which accommodates a power source portion and a viewfinder portion and a casing (the body) which accommodates the camera portion and the recorder portion are coupled to each other in such a manner that they can rotate with respect to each other around a common axis and the angle made by the lens portion and the grip portion (the casing accommodating the power source portion and the view finder portion can be optionally changed when the grip portion is rotated so that the attention of the user can be freed.

Although handling can be facilitated by arranging the grip portion to be movable in the manner of the conventional camera-integrated video recorders, a further improvement has been desired because they cannot meet all of the conditions such as all of the photographing conditions, the posture of the user, the physique of the user and the like. In addition, since the grip portion is arranged to be movable, it is difficult to store depending upon the position of the grip portion. Furthermore, a problem in terms of the accommodation space remains unsolved.

SUMMARY OF THE INVENTION

An object of the present invention is to solve the above-stated problems.

Another object of the present invention is to provide a camera-integrated video recorder apparatus which can be easily handled and which exhibits an excellent mobility regardless of the camera angle.

In order to achieve the above-stated objects, according to the present invention, there is provided a camera-integrated video recorder in which a camera means and a recorder means are disposed in a single casing, the camera-integrated video recorder being arranged in such a manner that its grip portion having a viewfinder is rotatably and detachably fastened to the casing.

A further object of the present invention is to provide a camera or a camera-integrated video recorder arranged in such a manner that a detachably provided grip serves as a remote controller and the sensed image can be monitored on a viewfinder disposed in the grip portion.

A still further object of the present invention is to provide a camera-integrated video recorder whose grip, which is capable of varying the grip accommodating ways, selecting the state of the grip to meet the conditions of use and the desires from the user, facilitating handling, improving mobility and having a control portion, can be detached, the grip thus detached serving as a remote controller capable of remote-controlling the camera-integrated video recorder, causing handling to be facilitated and the accommodating space to be effectively saved.

An additional object of the present invention is to provide a system arranged in such a manner that a grip means having a viewfinder and a camera and recorder means are arranged to be rotatable and detachable from each other so that the state of the grip means is selected to meet the conditions of the use and the desire of the user, while handling can be facilitated and mobility can be improved. Furthermore, since the grip means can serve, after detachment, as a remote controller for remote-controlling the camera and recorder means, the system can be used in further various conditions and with which the accommodation space can be saved and it can be carried readily.

In order to achieve the above-described objects, according to the present invention, there is provided a camera-integrated video recorder arranged in such a manner that a camera means thereof and a recorder means thereof are disposed in a single casing and a grip means having an image monitor means and a control portion for controlling the camera means and the recorder means is detachably fastened thereto, the camera-integrated video recorder comprising: operation information transmission means disposed in the grip means and capable of remote-controlling the camera means and the recorder means by transmitting operation information of the control portion when the grip means has been detached from the casing; and image transmission means disposed in the casing and capable of transmitting image information to the image monitor means of the grip means when the grip means has been detached from the casing.

Other and further objects, features and advantages of the invention will appear more fully from the following description.

BRIEF DESCRIPTION OF THE DRAWINGS

FIG. 5 is block diagram which illustrates the circuit for use in the camera-integrated video recorder according to another embodiment of the present invention.

DETAILED DESCRIPTION OF THE PREFERRED EMBODIMENTS

Preferred embodiments of a camera-integrated video recorder according to the present invention will now be described with reference to the drawings.

Figure 1:
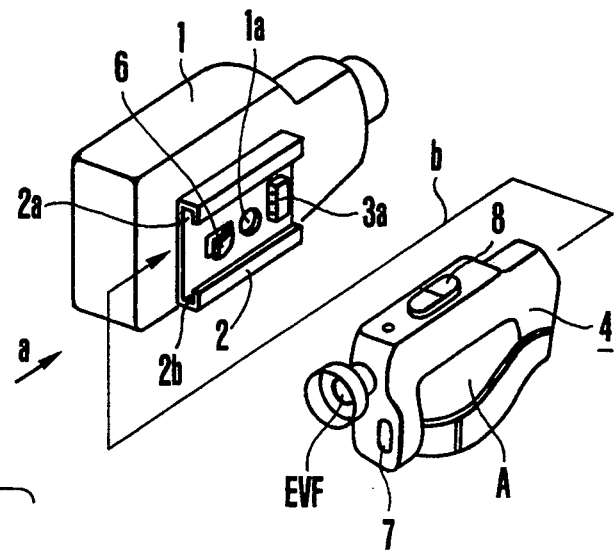
FIG. 1 is a perspective view which illustrates the structure of a camera-integrated video camera recorder according to the present invention.
Figure 2:
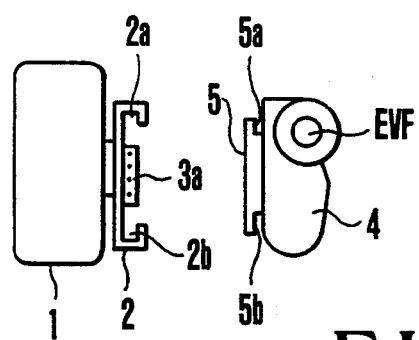
FIG. 2 is a rear view when viewed in the direction of an arrow "a" in FIG. 1.
Figure 3:
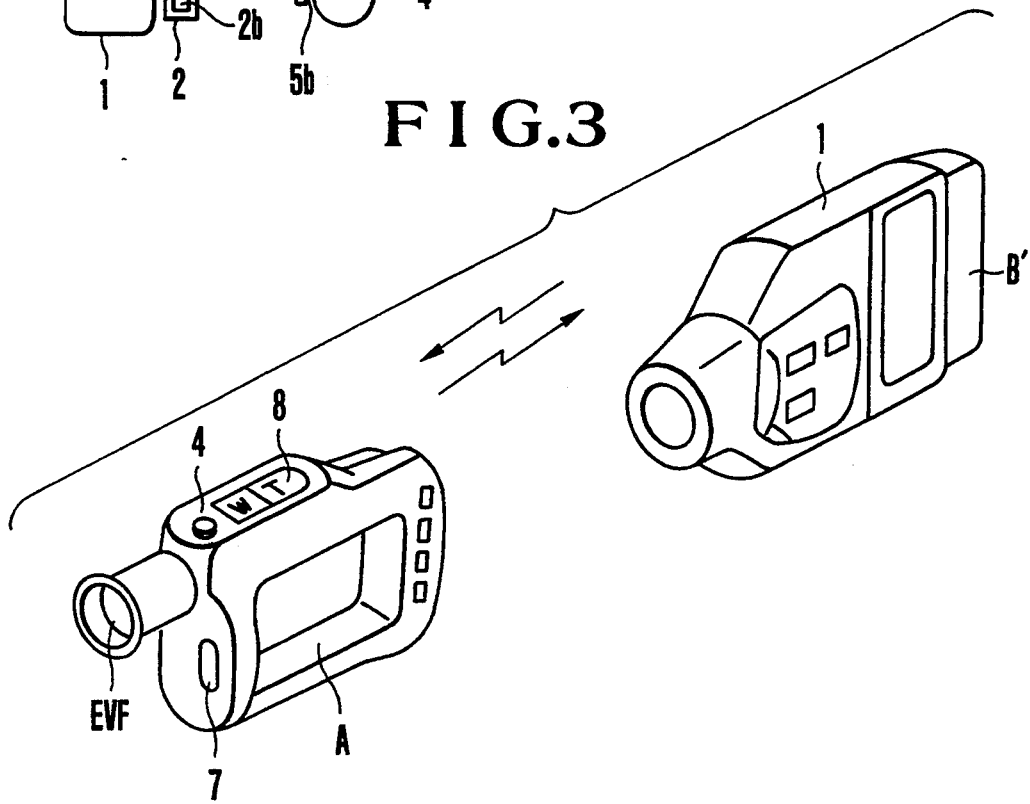
FIG. 3 is a perspective view which illustrates the camera-integrated video recorder according to the present invention when viewed in another direction in FIG. 1.

FIG. 1 is a perspective view which illustrates the camera-integrated video recorder according to the present invention and also illustrates a state in which a camera and recorder portion and a grip portion have been detached from each other when viewed from the rear side. FIG. 2 is a rear view of the state shown in FIG. 1 when viewed in the direction of the arrow "a" in FIG. 1. FIG. 3 is a perspective view which illustrates another usage state of the camera-integrated video recorder in which the camera and recorder portion and the grip portion have been detached from each other.

Referring to the figures, reference numeral 1 represents a casing (to be called "a camera body" hereinafter) having a camera portion and a recorder portion. Reference numeral 2 represents an attachment base which is rotatably fastened to the camera body 1 by means of a rotary shaft 1a and to which a grip portion, to be described later, can be fastened. The attachment base 2 can be formed by bending its two sides in substantially U-shape facing side, the attachment base 2 having fastening grooves 2a and 2b arranged to be engaged with the grip portion to be described later so as to hold it. Reference numeral 3a represents a connector having a plurality of electric contacts through which signals pass between the camera body 1 and the grip portion, the electric contacts acting to supply power or the like when the grip to be described later is fastened. Reference numeral 4 represents a grip portion having an electronic viewfinder EVF, a zoom operating switch 8 and switches such as a recording trigger switch 7 for starting the recording operation. As is shown in FIG. 3, the grip portion 4 has a portion A for accommodating a power source battery therein so that the power source battery is accommodated in the grip portion 4. The grip portion 4 has, on its surface which is fastened to the camera body 1, a grip-side attachment 5 fixed thereto and having fastening projections 5a and 5b arranged to be engaged with the fastening grooves 2a and 2b formed in the attachment base 2 of the camera body 1. As designated by an arrow "b" shown in FIG. 1, the grip portion 4 can be fastened to the camera body 1 in such a manner that the attachment 5 of the grip portion 4 is moved from the rear portion of the camera body 1 along the fastening grooves 2a and 2b so as to be engaged with the attachment base 2. The fastening of the camera body 1 and the grip portion 4 also establishes an electric connection between the circuit connector 3a provided for the camera body 1 and a circuit connector 3b, (FIG. 4) to be described later, provided for the grip 4.

After the fastening of the camera body 1 and the grip portion 4 has been completed, the fastening state is locked by a locking mechanism 6. Thus, the grip portion 4 is rotatably fastened to the camera body 1, centering the rotary shaft 1a so that the most suitable camera angle can be made so as to correspond to a variety of photographing conditions.

Since circuits are established between the grip portion 4 and the camera body 1 by the circuit connectors 3a and 3b, the range of the angles in which the grip portion 4 can rotate with respect to the camera body 1 has been previously restricted by a stopper (omitted from illustration) to a predetermined angle.

The circuit formed in the camera-integrated video recorder will be described with reference to FIG. 4.

Figure 4:
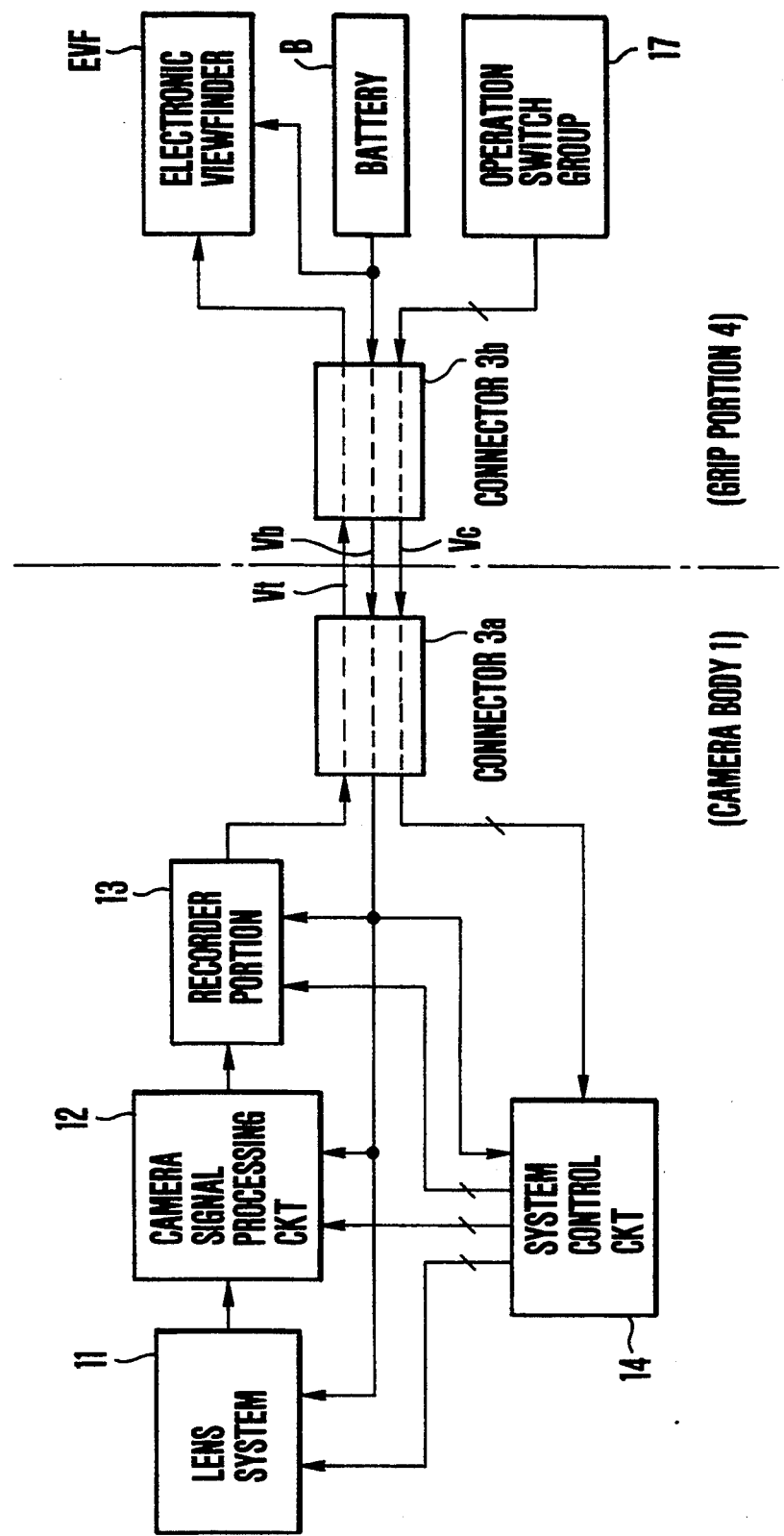
FIG. 4 is a block diagram which illustrates the circuit for use in the camera-integrated video recorder according to the present invention.

Referring to FIG. 4, light which has made incident through a photographing lens system 11 provided in the camera body 1 is photo-electrically converted by a camera-signal processing circuit 12, and is processed in a predetermined way so as to be converted into a TV signal. Then, the TV signal is supplied to a recorder portion 13. In the recorder portion 13, recording on a recording medium such as a magnetic tape is, if necessary, conducted in accordance with an operation of a user. All of the above-stated circuits are collectively controlled by a system control circuit 14.

During the recording operation, the above-stated TV signal is supplied to the connector 3a via the recorder portion 13 so that it is then transmitted to the grip-side connector 3b which is mechanically and electrically connected to the connector 3a, the TV signal being transmitted via a video signal line Vt. The TV signal is supplied to the electronic viewfinder EVF disposed in the grip portion 4 so that a picture which is being taken can be monitored.

The user can control the recording action by operating various switches such as the zoom operating switch 8, the recording trigger switch 7 or the like while monitoring the picture displayed on the electronic viewfinder EVF. The control signals for conducting the above-stated controls are transmitted through a control signal line Vc.

The state of the operation of an operation switch group 17 such as the zoom operating switch 8, the recording trigger switch 7, and the other switches disposed in the grip portion 4 is also supplied to the system control circuit 14 in the camera body 1 via the connectors 3a and 3b. As a result, the mode of the lens system 11, the camera signal processing circuit 12 and the recorder portion 13 are controlled in accordance with the state of the operation of the operation switch group 17. The camera body 1 is supplied with power from the power source battery B accommodated in the grip portion 4 via a power supply line Vb formed by the connectors 3a and 3b, while the grip-side circuit is directly supplied with power from the grip-side battery B.

Another structure may be employed in which an output from the power source battery B is first supplied to a power supply voltage stabilizing circuit (omitted from illustration) provided for the camera body 1 via the connectors 3a and 3b so as to be a constant voltage, the output being then again transmitted through the connectors 3a and 3b so as to be supplied to each of the circuits in the grip portion 4.

FIG. 5 is a block diagram which illustrates a second embodiment of the circuit according to the present invention. This embodiment is characterized in that the camera body 1 can be remote-controlled in such a manner that the grip portion 4 is arranged to act as a remote controller after it has been detached from the camera body 1. According to this embodiment, the same elements as those according to the first embodiment shown in FIG. 4 are given the same reference numerals and their descriptions are omitted here.

A power source battery B' is provided for the camera body 1 in order to supply power to each of the circuits in the camera body 1. Furthermore, a control-signal receiving circuit 15 is also provided for the purpose of receiving an operation command signal from the remote controller which is the grip portion 4 detached from the camera body 1. The command signal from the remote controller is received by the receiving circuit 15 in which it is demodulated and decoded so as to be supplied to the system control circuit 14. As a result, the circuits in the camera body 1 are operated.

In order to display an image which is being photographed by the camera body 1 or a reproduced image signal on the electronic viewfinder EVF of the grip portion 4 when the grip portion 4 has been detached, a video signal transmission circuit 16 for supplying a signal in the recorder portion 13 to the grip portion 4 is provided.

The above-stated circuits are switched by means of switched Sc1, Sc2, Sc3 and Sc4 which can be automatically switched in accordance with the connection/disconnection of the connectors 3a and 3b. These switches are switched to a contact "a" when the grip portion 4 is coupled to the camera body 1 and the connectors 3a and 3b are thereby connected to each other. As a result, power supply to the circuits from the camera-side battery B' is terminated but power from the grip-side battery B supplied via the power supply line Vb formed by the connectors 3a and 3b is supplied to the circuits in the camera body 1.

When the grip portion 4 is detached, the switches Sc1, Sc2, Sc3 and Sc4 are switched to a contact "b" so that all of the circuits in the camera body 1 are operated by the built-in battery B'. Also, the transmission circuit 16 and the receiving circuit 15 are supplied with power and thereby actuated.

On the other hand, the grip portion 4 is provided with a receiving circuit 18 for receiving a video signal transmitted from the camera-side transmission circuit 16 and supplying it to the electronic viewfinder EVF when the grip portion 4 is detached, the grip portion 4 being further provided with a transmission circuit 19 for supplying an operation command signal generated by the operation switch group 17 in the grip portion 4 to the camera body 1.

Furthermore, switches Sr1, Sr2 and Sr3 arranged to be switched in accordance with the connection/disconnection of the connectors 3a and 3b are provided for the grip potion 4. These switches are switched to the contact "a" when the grip portion 4 is coupled to the camera body 1 so that power supply to the transmission circuit 19 and the receiving circuit 18 in the grip portion 4 is terminated, but power from the battery power source B disposed in the grip portion 4 is supplied to the camera body 1 via the connectors 3a and 3b. A mode instruction signal corresponding to the operation of each of the switches of the operation switch group 17 is converted by the grip-side system control circuit 20 into a control signal which corresponds to the operation of each of the switches, the control signal being then supplied to the camera-side system control circuit 14 via the connectors 3a and 3b.

When the grip portion 4 has been detached from the camera body 1, the switches Sr1, Sr2 and Sr3 are switched to the contact "b" so that power is supplied to the receiving circuit 18 and the transmission circuit 19, causing these circuits to be actuated. Furthermore, the power supply via the connectors 3a and 3b is terminated. The mode instruction signal corresponding to the operation of the switches of the operation switch group 17 is converted by the grip-side system controller 20 into a control signal which corresponds to the operation of each of the switches, the control signal being then supplied to the transmission circuit 19 so that the instruction signal can be transmitted to the camera body 1.

As described above and according to this embodiment of the apparatus, the battery B' in the camera body 1 is disconnected from the transmission circuit 16 and the receiving circuit 15 so that these circuits are turned off when the grip portion 4 is coupled to the camera body 1. On the other hand, both the transmission circuit 19 and the receiving circuit 18 in the grip portion 4 are disconnected from the battery B so that these circuits are turned off, power of the battery B being supplied to the camera body 1 via the power supply line Vb established by the connectors 3a and 3b. Also the operation instruction signal and the image signal to be monitored are transmitted through the control signal line Vc and the video signal line Vt established by the connectors 3a and 3b. Therefore, the same operating state as that according to the embodiment shown in FIG. 4 can be realized.

When the grip portion 4 has been detached from the camera body 1, the connectors 3a and 3b are separated from each other, causing the electrical connection established between the camera body 1 and the grip portion 4 to be disconnected. Therefore, the switches Sc1, Sc2, Sc3 and Sc4 of the camera body 1 are switched to the contact "b", while the switches Sr1, Sr2 and Sr3 of the grip portion 4 are switched to the contact "b".

As a result, power is supplied from the battery B' included in the camera body 1 to the components of the camera body 1 such as the lens system 11, the camera signal processing circuit 12, the recorder portion 13, the transmission circuit 16 and the receiving circuit 15. Furthermore, the control instruction input terminal of the system control circuit 14 is switched from the connector to the receiving circuit 15 so that it receives the control instruction signal transmitted from the grip portion 4. As a result, the circuits are controlled in accordance with the contents of the control instruction signal.

Each of the circuits in the grip portion 4 is supplied with power from the remote controller-side power source battery B so that the included receiving circuit 18 and the transmission circuit 19 are actuated. The operation instruction signal transmitted from the system control circuit 20 is transmitted to the camera body 1 via the transmission circuit 19. That is, the action of the camera body 1 can be remote-controlled by operating the operation switch group 17 provided for the grip portion 4. Furthermore, the video signal transmitted from the camera-side transmission circuit 19 is received by the receiving circuit 18 so as to be displayed on the electronic viewfinder EVF.

As described above, since the grip portion 4 can be used as the remote controller capable of controlling the action of the camera body 1 when the grip portion 4 has been detached from the camera body 1, the shooting can be freely conducted. Furthermore, when it is not used as the remote controller, it serves as the grip. Therefore, an independent space for the accommodation of the grip is not necessary, and losing or forgetting of the grip can be prevented.

As the transmission means is necessary when grip is being used as the remote controller according to the above described embodiments, radio waves, infrared rays or the like can be employed. Furthermore, analog-modulated infrared rays or digital-modulated infrared rays which are employed as usual remote controllers can be employed. Since these communication means can utilize the conventional means, its description is omitted here.

As described above, according to the camera-integrated video recorder apparatus, the camera body is arranged in such a manner that the grip portion having the viewfinder and the camera and the recorder portions are rotatable with respect to each other and detachable. Therefore, the grip can be selected to correspond to the conditions of use and to meet the desires from the user. As a result, handling can be facilitated and the mobility can be improved.

Furthermore, since the grip portion can serve, when it is detached from the camera body, as the remote controller for remote-controlling the camera and the recorder portion, it can be used further widely.

In addition, a system overcoming a problem in terms of an accommodation space can be easily realized.

Although the invention has been described in its preferred form with a certain degree, it is understood that the present disclosure of the preferred form can been changed in the details of construction, and the combination and arrangement of parts may be modified without departing from the spirit and the scope of the invention as hereinafter claimed.

What is claimed is:

1. A camera-integrated video recorder in which a camera means and a recorder means are disposed in a single casing, comprising:
    a casing having a first power source;
    a grip having an electronic viewfinder and a control portion for controlling operations of said camera means and said recorder means, and having a second power source;
    an attachment base for fastening said grip and rotatably fastened to said casing, said attachment base having a locking mechanism capable of locking the fastened state of said grip and electric connectors for electrically connecting said grip to said casing in the state that said grip has been fastened thereto;
    selecting means for making to supply said casing and said grip with power by only the second power source in the state that said grip has been fastened to said attachment base;
    said grip detachably fastened to said attachment base, said grip being arranged to be capable of effecting remote control of said camera means and/or said recorder means by using said control portion in the state where said grip is detached from said attachment base.

2. A camera-integrated video recorder according to claim 1, wherein said grip has a portion for accommodating a power source battery.

3. A camera-integrated video recorder in which a camera means and a recorder means are disposed in a single casing having an attachment base to which a grip having an image monitor means and a control portion for controlling said camera means and said recorder means is detachably fastened, said camera-integrated video recorder comprising:
    a first power source disposed in said casing;
    a second power source disposed in said grip;
    means for rotatably fastening said attachment base to said casing, said attachment base having a locking mechanism capable of locking the fastened state of said grip and having electrical connectors for electrical connection of said grip to said casing in the fastened state of said grip;
    selecting means for making to supply said casing and said grip with power by only the second power source in the state that said grip has been fastened to said attachment base;
    operation information transmission means disposed in said grip and capable of remote-controlling said camera means and said recorder means by transmitting operation information of said control portion in the state that said grip has been detached from said attachment base; and
    image transmission means disposed in said casing and capable of transmitting image information to said image monitor means of said grip in the state that said grip has been detached from said attachment base,
    wherein said image transmission means in said casing is rendered inoperative in the state that said casing and said grip have been coupled to each other and is rendered operative in the state that said casing and said grip have been separated from each other,
    wherein said operation information transmission means disposed in said grip is rendered inoperative in the state that said casing and said grip have been coupled to each other and is rendered operative in the state that said casing and said grip have been separated from each other,
    wherein a receiving circuit disposed in said grip for receiving image information transmitted from said image transmission means in said casing is rendered inoperative in the state that said casing and said grip have been coupled to each other and is rendered operative in the state that said casing and said grip have been separated from each other, and
    wherein a receiving circuit disposed in said casing for receiving operation information transmitted from said operation information transmission means in said grip is rendered inoperative in the state that said casing and said grip have been coupled to each other and is rendered operative in the state that said casing and said grip have been separated from each other.

4. A camera-integrated video recorder according to claim 3, wherein said casing and said grip each accommodate a power source battery.

5. A camera-integrated video recorder according to claim 4, wherein said power source battery in said casing is arranged in such a manner that its power supply path is turned off in the state that said casing has been coupled to said grip and is turned on in the state that said casing and said grip have been separated from each other.

6. A camera apparatus comprising a camera body and a wireless remote controller for operating said camera body, said camera body having a first power source and an image transmission means for transmitting photographed or reproduced image information, and said wireless remote controller having a second power source, an operation means for operating said camera body, operation information transmission means for transmitting operation information of said operation means to said camera body, a receiving circuit for receiving image information transmitted from said image transmission means in said camera body, image monitoring means for monitoring said image information received by said receiving circuit, wherein a grip is formed in said wireless remote controller and an attachment base for fastening said grip and rotatably fastened to said camera body, said attachment base having a locking mechanism capable of locking the fastened state of said grip and electrical connectors for electrically connecting said grip to said camera body in the state that said grip has been fastened thereto, said grip serving as a rotary grip arranged to be detachable from said camera body and capable of rotatably supporting said camera body in the state that said grip has been fastened to said attachment base, said image monitoring means being arranged to operate as an electronic viewfinder in the state that said wireless remote controller is attached to said camera body, and wherein said camera apparatus further comprises selecting means for making to supply said casing and said grip with power by only said second power source in the state that said grip has been fastened to said attachment base.

7. A camera apparatus according to claim 6, wherein said camera body and said grip each accommodate a power source battery.

8. A camera apparatus according to claim 7, wherein said power source battery in said camera body is arranged in such a manner that its power supply path is turned off in the state that said camera body and said remote controller have been coupled to each other and is turned on in the state that said camera body and said remote controller grip have been separated from each other.

9. A camera apparatus according to claim 8, wherein said image transmission means in said camera body is rendered inoperative in the state that said camera body and said grip have been coupled to each other and is rendered operative in the state that said wireless remote controller has been detached from said camera body.

10. A camera apparatus according to claim 8, wherein said operation information transmission means in said wireless remote controller is rendered inoperative in the state that said camera body and said wireless remote controller have been coupled to each other.

11. A camera apparatus according to claim 8, wherein said receiving circuit in said wireless remote controller and capable of receiving image information transmitted from said image transmission means in said camera body is rendered inoperative in the state that said camera body and said wireless remote controller have been coupled to each other.

12. A camera apparatus according to claim 8, wherein a receiving circuit disposed in said camera body for receiving operation information transmitted from said operation information transmission means in said wireless remote controller is rendered inoperative in the state that said wireless remote controller has been coupled to said camera body.

13. A camera-integrated video recorder in which a camera means and a recorder means are disposed in a single casing having a first power source, the camera-integrated video recorder comprising:
a grip having an electronic viewfinder and a control portion for controlling operations of said camera means and said recorder means, and having a second power source, first connecting means for making to input video signals to said electronic viewfinder from said camera means, second connecting means for making to input signals for said controlling operations to said casing from said control portion, and third connecting means for making to supply said casing with power by the second power source;
and attachment base for fastening said grip and fastened to said casing;
said grip detachably fastened to said attachment base, said grip being arranged to be capable of effecting remote control of said camera means and/or said recorder means by using said control portion in the state where said grip is detached from said attachment base;
switching means for executing connection of said first connecting means to said electronic viewfinder, connection of said second connecting means to said control portion and connection of said third connecting means to said second power source respectively in the sate that said grip has been fastened to said attachment base, releasing each of said connections in the state where said grip is detached from said attachment base.

14. A camera-integrated video recorder according to claim 13, said attachment base having a locking mechanism capable of locking the fastened state of said grip and electric connectors for electrically connecting said first, second and third connecting means in the state that said grip has been fastened thereto.

15. A camera-integrated video recorder in which a camera means and a recorder means are disposed in a single casing, comprising:
a casing having a first power source;
a grip having an electronic viewfinder and a control portion for controlling operations of said camera means and said recorder means, and having a second power source;
an attachment base for fastening said grip and fastened to said casing;
selecting means for making to supply said casing and said grip with power by only the second power source in the state that said grip has been fastened to said attachment base;
said grip detachably fastened to said attachment base, said grip being arranged to be capable of effecting remote, control of said camera means and/or said recorder means by using said control portion in the state where said grip is detached from said attachment base.

16. A camera-integrated video recorder according to claim 15, said attachment base having electric connectors for electrically connecting said grip to said casing in the state that said grip has been fastened thereto.

17. A camera-integrated video recorder according to claim 16, said attachment base having a locking mechanism capable of locking the fastened state of said grip.

* * * * *

UNITED STATES PATENT AND TRADEMARK OFFICE
CERTIFICATE OF CORRECTION

PATENT NO. : 5,381,179
DATED : January 10, 1995
INVENTOR(S) : Kazunori Kashimura It is certified that error appears in the above-indentified patent and that said Letters Patent is hereby corrected as shown below:

Col. 10, line 22. Change "sate" to -- state --.

Signed and Sealed this

Twelfth Day of September, 1995

Attest:

BRUCE LEHMAN

Attesting Officer

Commissioner of Patents and Trademarks